Figure 1:
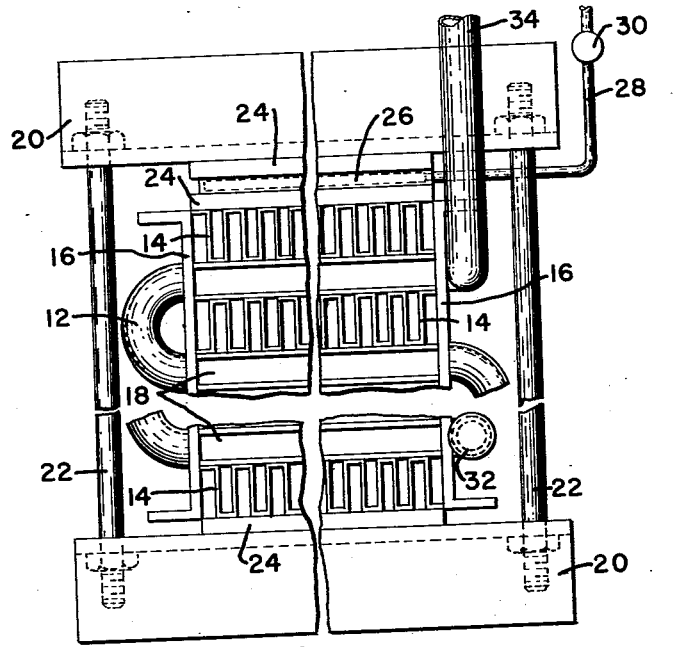

INVENTOR.
Edmund F. Schweller
BY R. R. Candor
His Attorney

United States Patent Office 2,794,243
Patented June 4, 1957

2,794,243

METHOD OF BRAZING CORRUGATED FINS TO FLAT TUBING

Edmund F. Schweller, Dayton, Ohio, assignor to General Motors Corporation, Detroit, Mich., a corporation of Delaware Application April 21, 1953, Serial No. 350,077

1 Claim. (Cl. 29—472.3)

This invention relates to refrigerating apparatus and more particularly to an apparatus and method for use in manufacturing heat exchangers for use in refrigerating systems and the like.

One object of this invention is to provide an improved method for brazing fins to flat sided tubing.

Another object of this invention is to provide a simple and inexpensive fixture for use in brazing heat exchangers and the like.

It has been found that it is very difficult to obtain a good bond between the fins and flat fluid conduits due to the tendency for the flat walls of the conduits when heated to brazing temperatures to either bulge outwardly or inwardly depending upon the difference between the internal pressure and the external pressure on the side walls of the tubing. It is an object of this invention to provide an adjustable pressure fixture for holding the fins in engagement with the side walls of the flat tubing at a pressure which makes it possible to obtain a proper balance between the external pressure and the internal pressure during the brazing operation.

More particularly it is an object of this invention to provide a fixture which includes an expansible bellows or the like for varying the effective pressure which holds the fins in engagement with the side walls of the tubing.

Further objects and advantages of the present invention will be apparent from the following description, reference being had to the accompanying drawings, wherein a preferred form of the present invention is clearly shown.

Figure 2:
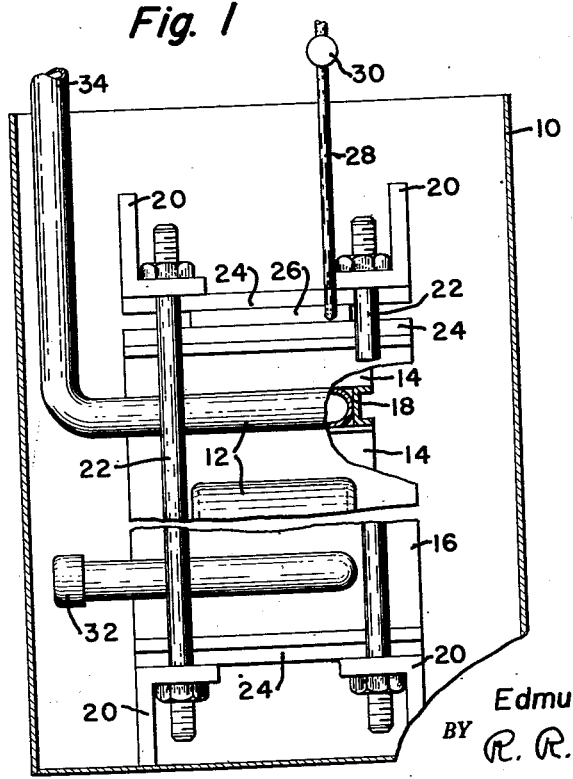

In the drawings:

Figure 1 is a side elevational view somewhat diagrammatic showing a heat exchanger supported within a fixture constructed in accordance with the invention; and, Figure 2 is an end elevational view with parts broken away showing the fixture in place within a receptacle of the type adapted to be used in applying flux or brazing material to the external surfaces of a heat exchanger.

Referring now to the drawing wherein a preferred embodiment of the invention has been shown, reference numeral 10 designates a liquid receptacle of the type adapted to contain liquid into which the heat exchanger is to be dipped. Reference numeral 12 generally designates flat walled tubing which has been bent into serpentine shape with corrugated fin sections 14 placed on opposite sides of the flat walled tubing as shown. The usual heat exchanger end members 16 have been provided as shown and serve as supports for mounting the heat exchanger after the same has been finished. U-shaped channel members 18 are placed adjacent the opposite side edges of the tubing with the arms of the channel members in engagement with the overhanging ends of the fin elements 14. For a more complete description of the construction of the heat exchanger per se reference is hereby made to my said copending application. In order to facilitate brazing the fin elements onto the side walls of the flat tubing it is necessary to provide a fixture for holding the fins and tubing in proper relationship during the brazing operation.

Due to dimensional irregularities in the various parts of the heat exchangers and unpredictable distortions resulting from heating the assembly, it is impossible to use a holding fixture unless the fixture is adjustable. It has been found that when a heat exchanger is preheated in air or dipped into a molten liquid flux or brazing alloy the resultant heating of the parts causes unequal expansion and contraction of the various elements of the heat exchangers. Attempts were first made to use coil springs in the fixtures for applying the desired pressure but the metal springs were adversely affected by the high temperatures involved and were otherwise unsatisfactory.

In manufacturing heat exchangers constructed as shown, it is necessary to obtain a good bond between the fins and the side walls of the tubing throughout the entire area of contact. One way to do this is to place thin sheets of bonding material between the fin surfaces and the side walls of the tubing and to then heat the assembly in the presence of a flux so as to fuse the bonding material. During this heating process, the internal stresses in the metal of the fins and the tubing are relieved and this accounts for some of the changes which take place in the shape and size of the parts. Unless proper adjustment is made for these changes as they occur it is impossible to obtain a good bond between the fins and the tubing.

According to this invention the assembly is placed in a fixture of the type shown in the drawings wherein four angle iron frame members 20 are bolted together by means of the long bolts 22 as shown so as to form adjustable clamps between which the heat exchanger may be held. Two flat plates 24 are provided at the top and one at the bottom as shown. The two upper plates 24 are provided above the upper fin and are adapted to receive between them a flat expansible bellows or diaphragm element 26 which is adapted to be connected to a source of pressure 28 through a pressure regulating valve 30. By regulating the pressure applied to the bellows 26 it is possible to closely regulate the pressure between the various fin units and the side walls of the flat tubing 12.

During any dipping or brazing operation which may be performed, the one end of the heat exchanger tubing 12 is blocked off by means of a cap 32 and the other end of the tubing is connected to a conduit 34 which serves to supply fluid pressure to the interior of the tubing so as to prevent this tubing from collapsing. It is important to obtain the proper balance between the internal pressure and the external pressure so as to avoid distortion of the side walls of the tubing during the brazing operation. It has been found that a pressure of 1 pound per square inch gauge within the tubing 12 and a pressure of approximately 3 pounds per square inch gauge within the bellows 26 maintains the proper relationship between the internal pressure and the external pressure.

While the form of embodiment of the invention as herein disclosed constitutes a preferred form, it is to be understood that other forms might be adopted, as may come within the scope of the claim which follows.

What is claimed is as follows:

The method of brazing strips of corrugated fins to flat tubing which comprises assembling corrugated fins between adjacent parallel sections of flat tubing with the peaks of the corrugations arranged in face to face contact with the outer surfaces of the flat tubing, placing the assembly in a fixture with a pressure actuated device arranged to press the fins and tube sections into engagement with one another at a controlled pressure while in said fixture, supplying fluid pressure internally of said tubing, counterbalancing said internal fluid pressure by means of fluid pressure applied to said pressure actuated device so as to press said fins and a brazing material into engagement with the outer walls of said tubing, dipping said fins and said tubing while thus pressed together into a hot brazing flux so as to braze the opposite peaks of the corrugations of said fins to said tubing, and removing the assembly from said hot flux so as to cool the assembly.

References Cited in the file of this patent

UNITED STATES PATENTS

| | | |
|---|---|---|
| 1,508,342 | Lee | Sept. 9, 1924 |
| 2,268,369 | Askin | Dec. 30, 1941 |
| 2,298,895 | McKibben et al. | Oct. 13, 1942 |
| 2,332,368 | Burtenshaw | Oct. 19, 1943 |
| 2,366,164 | Weick et al. | Jan. 2, 1945 |
| 2,414,159 | Modine | Jan. 14, 1947 |